United States Patent [19]

Rees

[11] Patent Number: 4,981,278
[45] Date of Patent: Jan. 1, 1991

[54] VEHICLE SEAT SLIDE STRUCTURE

[76] Inventor: Richard W. A. Rees, 269 Donegal Dr., Rochester Hills, Mich. 48309

[21] Appl. No.: 276,812

[22] Filed: Nov. 28, 1988

[30] Foreign Application Priority Data

Dec. 21, 1987 [CA] Canada .................................. 555020

[51] Int. Cl.⁵ ............................................ F16M 13/00
[52] U.S. Cl. ..................................... 248/430; 297/346
[58] Field of Search ............... 248/429, 430, 420, 424; 297/346

[56] References Cited

U.S. PATENT DOCUMENTS

| | | | |
|---|---|---|---|
| 1,726,597 | 9/1929 | Templeton | 248/430 |
| 2,031,248 | 2/1936 | Bishop | 248/429 |
| 2,472,593 | 6/1949 | King | 211/143 |
| 3,120,371 | 2/1964 | Dall | 248/397 |
| 3,258,240 | 6/1966 | Kirk | 248/429 X |
| 3,507,472 | 4/1970 | Agee | 248/429 |
| 3,740,014 | 6/1973 | Swenson et al. | 248/429 X |
| 4,511,187 | 4/1985 | Rees | 308/3.8 |
| 4,653,821 | 3/1987 | Faust | 312/337 |
| 4,821,989 | 4/1989 | Munakata et al. | 248/430 |

FOREIGN PATENT DOCUMENTS

| | | | |
|---|---|---|---|
| 127453 | 4/1948 | Australia | 248/430 |
| 810471 | 8/1951 | Fed. Rep. of Germany | 248/429 |
| 1417978 | 10/1965 | France | 248/429 |
| 828985 | 4/1960 | United Kingdom | 248/429 |

*Primary Examiner*—David L. Talbott
*Attorney, Agent, or Firm*—Riches, McKenzie & Herbert

[57] ABSTRACT

A seat slide structure is provided for supporting a vehicle occupant seat on a vehicle. An elongate channel is provided having a cylindrical guideway and an elongate slot. A generally cylindrical slide tube is coaxially received in the guideway with a planar support coupled to the tube and extending via this slot out through the channel member. Ring bearing means are provided within the channel member between the channel member and the slide tube to locate the slide tube coaxially slidable within the guideway. End caps are provided coaxially about each end of the channel member and serve to couple the channel member to the vehicle floor with improved resistance to failure under stress load conditions.

20 Claims, 8 Drawing Sheets

VEHICLE SEAT SLIDE STRUCTURE

SCOPE OF THE INVENTION

This invention relates to automobile seats and particularly to an antifriction seat slide mechanism for automobiles.

BACKGROUND OF THE INVENTION

In the past, many structures have been provided to support a vehicle occupant seat and to permit it to be slid forwardly and rearwardly as desired to be locked in different positions to accommodate occupants, particularly drivers of different height and size.

The automotive industry has conventionally adopted mechanisms such as those illustrated in the present inventor's U.S. Pat. Nos. 4,527,767 4,563,044 4,572,469; 4,580,755; 4,588,234; 4,438,898 and 4,487,459. Such mechanisms teach typical seat slides having upper and lower U-shaped tracks with special bearing assemblies typified by U.S. Pat. No. 4,511,187. These mechanisms suffer the disadvantages that they are relatively costly, are relatively heavy and may suffer from failure under collision conditions which would entail the seat structure breaking loose from the vehicle floor.

U.S. Pat. No. 3,120,371 to Dall teaches a seat track mechanism in which a sheet metal support is coupled to the vehicle floor. The support extends from the floor as a planar panel and ends as a formed support tube of cylindrical shape. A split tubular member is disposed coaxially about the support tube and carries brackets for mounting to a vehicle seat. Bearings are provided about the support tube so that the split tubular member is slidable longitudinally on the tube support coaxially therealong. Dall teaches a complex locking system to lock the split tubular member relative to the support tube.

The seat track mechanism of Dall suffers a number of disadvantages. In use of Dall, the occupant seat itself needs to have a support beam to extend longitudinally along top of the split tubular member. This support beam increases the overall weight of the seat system. The mechanism of Dall will disadvantageously become detached from the vehicle seat under failure loading conditions as occur in collisions. Under high loads, the split tube member will readily spread to disengage from about the support tube, whereby the seat will become detached from the vehicle. The locking system has a significant number of parts, is complex, heavy and difficult to assemble.

SUMMARY OF THE INVENTION

To at least partially overcome these disadvantages, the present invention provides a vehicle seat slide structure with a longitudinally slotted channel member coupled to the vehicle floor via end caps and a cylindrical tube slidable on bearings within the slotted channel member, the tube carrying a planar support member which extends through the slot of the channel member to support a vehicle seat.

An object of the present invention is to provide a lightweight seat slide structure.

Another object is to provide a seat slide structure which will retain the seat coupled to the vehicle floor under failure stress loads.

Another object is to provide a locking mechanism for a seat slide structure.

In a first of its aspects, the present invention provides

A seat slide structure for supporting a vehicle occupant seat on a vehicle comprising:

elongate channel means having an elongate generally cylindrical guideway means therein and an elongate axially extending slot means through the channel means into the guideway means, elongate generally cylindrical slide tube means in the guideway with a central axis therethrough, elongate planar support means secured to the slide tube means to extend outwardly from one side of the slide tube means thought the slot means in a plane parallel to the central axis through the slide tube means, ring bearing means within the channel means between the channel means are the slide tube means locating the slide tube means coaxially within the guideway means axially slidable therein, end cap means coaxially about each end of the channel means coupling the channel means to the vehicle floor, the support means adapted to be coupled to and support a vehicle occupant seat.

In another aspect, the present invention provides a seat slide structure in accordance with the first aspect wherein:

the lock means comprises a generally U-shaped rod means having two legs joined by a central bight portion, ends of the rod means coupled to respective ones of the two support means with the legs extending forwardly along the respective support means to the bight portion which extends between the support means, each end of the rod means coupled to the support means for pivoting about generally coincident axes roughly parallel the bight means, a plurality of similar catch means carried by the flange means of each channel means, each leg including a latch segment to engage the catch means on its respective channel means on pivoting of the rod means about the axes in a first direction and to disengage therefrom on pivoting in a second, opposite direction, biasing means urging the rod means to pivot about said axes in the first direction.

BRIEF DESCRIPTION OF THE DRAWINGS

Further aspects and advantages of the present invention will appear from the following description taken together with the accompanying drawings in which.

DETAILED DESCRIPTION OF THE DRAWINGS

Figure 1:
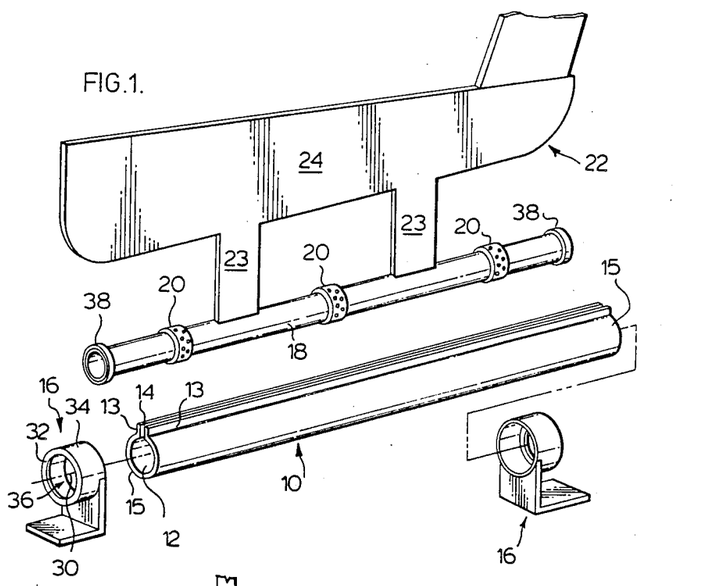
FIG. 1 is an exploded pictorial view of a first embodiment of a seat slide structure in accordance with the present invention.

Reference is made to FIG. 1 showing an exploded view of a first embodiment of a seat slide structure in accordance with the invention. Elongate channel member 10 comprises a sheet of metal bent to define a cylindrical guideway 12 open at a radially outwardly extending axial slot 14 bordered by planar parallel flanges 13. The ends 15 of channel member 10 are received in end caps 16 bolted to the floor pan of a vehicle.

Figure 2:
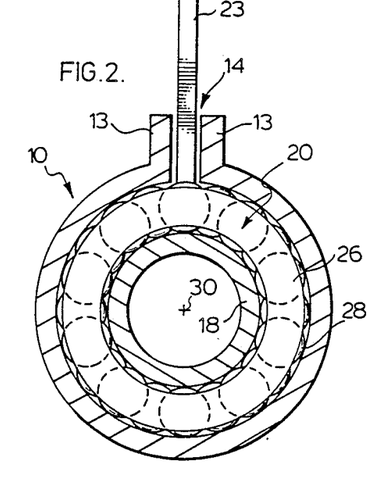
FIG. 2 is an end cross-sectional view of the seat slide structure shown in FIG. 1.

Cylindrical slide tube 18 is received in guideway 12 axially slidable therein by reason of three ring bearings 20 about tube 18 between channel members 10 and tube 18 as best seen in end cross-sectional view in FIG. 2.

Planar support member 22 has legs 23 which are welded at their lower end to tube 18 and extend radially outwardly from tube 18 through slot 14 to merge into an elongate planar beam-like portion 24 of support member 22. The support member 22 is adapted to be coupled to and support a vehicle occupant seat.

Two such seat slide structures are provided for each vehicle seat, with the channel members 10 parallel to each other and spaced laterally to permit sliding forwardly and rearwardly of the slide tubes 18 and the seat as a unit.

Figure 3:
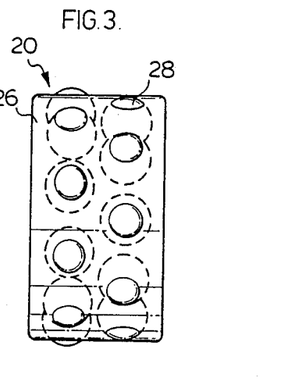
FIG. 3 is an end, radial view of a ring bearing shown on the seat slide structure of FIGS. 1 and 2.

FIG. 3 shows a preferred form of a ring bearing 20 for use with the first embodiment. Each ring bearing 20 comprises a casing 26 which constrains a number of ball bearings 28 therein. Casing 26 is of a radial thickness so that the surfaces of ball bearings 28 are at radially inner surfaces of casing 26 to engage slide tube 18 and at radially outer surfaces of casing 26 to engage the inner cylindrical side wall of channel member 10 within guideway 12. Each ball bearing is disposed at the same distance radially about a central axis 30 of slide tube 26 with which the cylindrical guideway is coaxial. Preferably, the casing may be a nylon type plastic material of high strength, moulded with ball bearings 20 in place and permitting the ball bearings freedom to rotate.

Each end cap 16 has an end wall 32 and a cylindrical side wall 34 extending from end wall 32 generally normal thereto. Each end 15 of channel member 10 abuts end wall 32 with side wall 34 closely received about the cylindrical outer side surfaces of channel member 10 near each of ends 15. End wall 32 has an end opening 36 coaxially about axis 30. End openings 36 are sized to permit slide tube 18 to pass therethrough yet to prevent bearing rings 20 from passing therethrough.

The ends 38 of slide tube 18 are enlarged as by being marginally flared to prevent bearing rings 20 from sliding off the ends. As seen in FIG. 1, bearing rings 20 are captured on slide tube 18 either between planar support members 22 or between a planar support member 22 and a flared end 38.

With end caps 16 bolted to the vehicle floor pan, under loading conditions which might otherwise spread channel member 10, end caps 16 will prevent such spreading and prevent the seat from becoming detached from the floor under failure load conditions. Preferably, slide tube 18 is longer than channel member 10 so that slide tube 18 will always pass through at least one end cap 16 and preclude the seat becoming detached from the vehicle.

Figure 4:
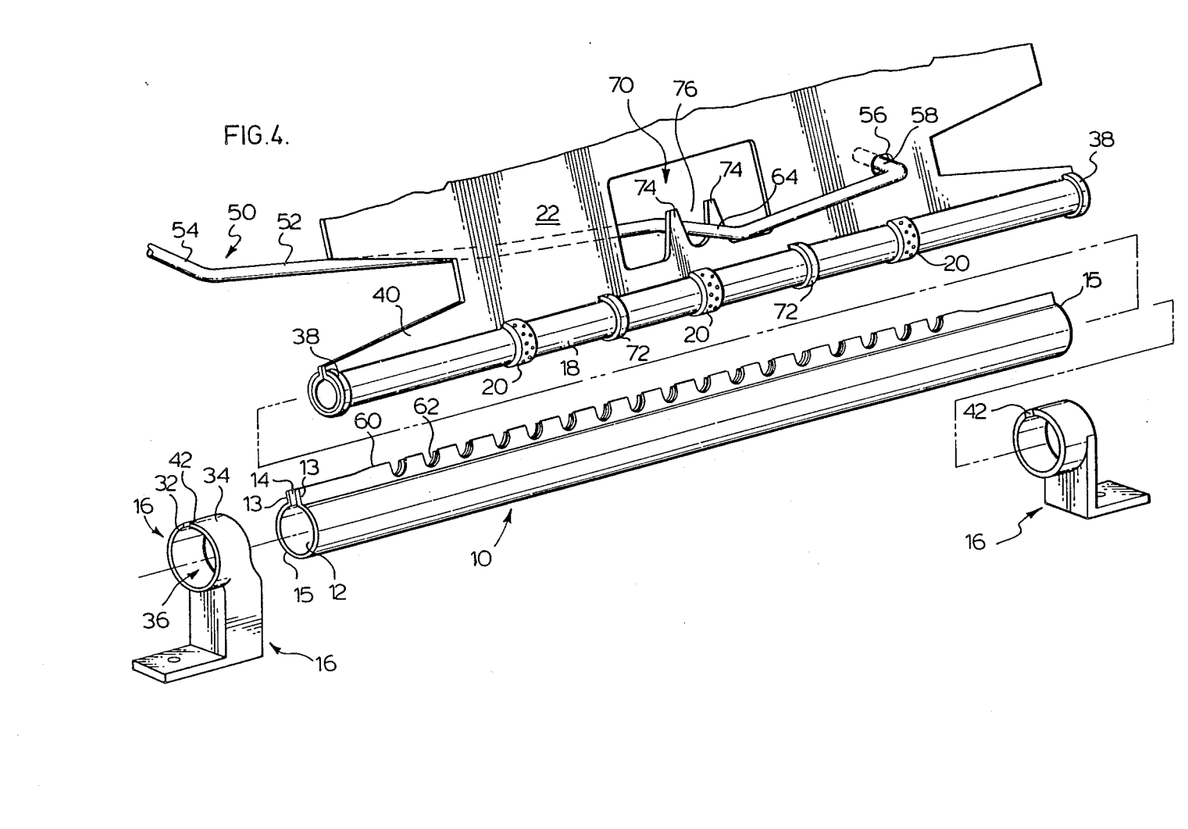
FIG. 4 is an exploded pictorial view of a second embodiment of a seat slide structure in accordance with the present invention and including a locking mechanism.

Reference is now fade to FIGS. 4 to 10 showing a second embodiment of a seat slide structure in accordance with the present invention. Similar elements of the second embodiment are designated by similar reference numerals used with the first embodiment. As seen in FIG. 4, channel member 10 has parallel flanges 13 about slot 14. Slide tube 18 is coaxially received and longitudinally slidable in guideway 12 with ring bearings 20 disposed between slide tube 18 and channel member 10.

Figures 5, 10:
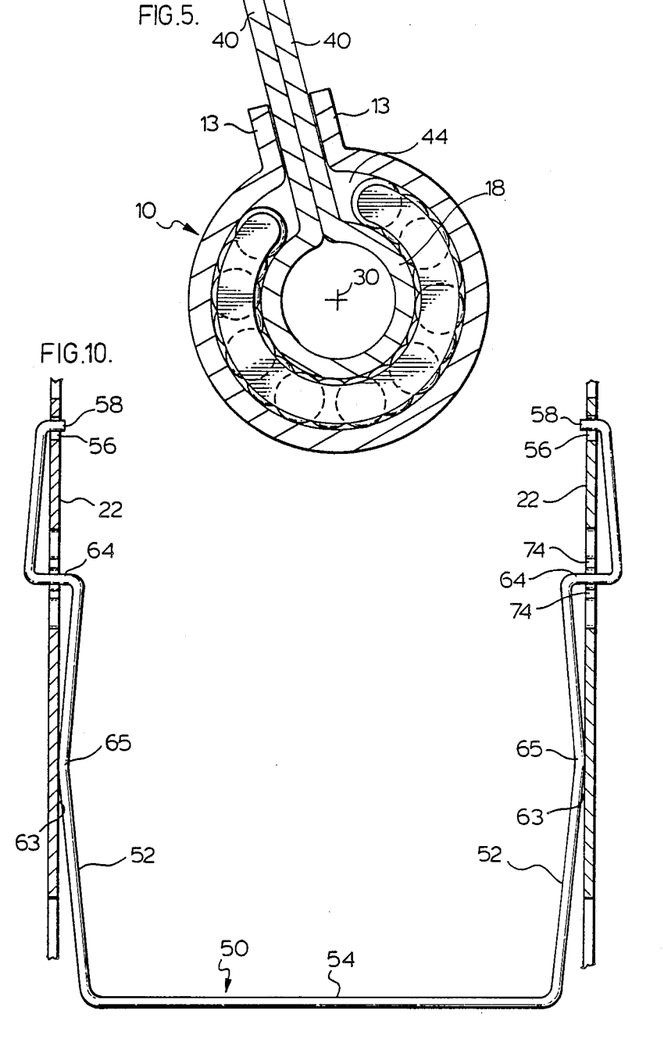
FIG. 5 is an end cross-sectional view of the seat slide structure shown in FIG. 4.
FIG. 10 is a schematic representation of a partially cross-sectioned top view which conceptually illustrates the relative interaction of a locking bar and cooperating support members of FIG. 9.

As best seen FIG. 5, slide tube 18 and planar support member 22 are formed from a single piece of sheet metal bent to from slide tube 18 at on end and with parallel planar flanges 40 extending upwardly to comprise planar support member 22. As the flanges 40 extend substantially the entire length of slide tube 18, each end cap 16 has a slot 42 through its cylindrical side wall 34 and end wall 32 into end opening 36 and aligned with slot 14 of channel member 10. This permits both the slide tube 18 and flanges 40 to pass through end cap 16.

Ring bearings 20 for the second embodiment are shown in FIG. 5 as comprising split ring members similar to those shown in FIGS. 2 and 3, but having a slot 44 therethrough through which flanges 40 may extend as best seen in FIG. 5.

Slide tube 16 is formed with a number of bearing stops to limit sliding of the bearing rings 20 over desired portions of the slide tube. These stops appear as flared portions at ends 38 of the slide tube 16 and as internal enlarged diameter segments 72 intermediate the ends.

Figure 6:
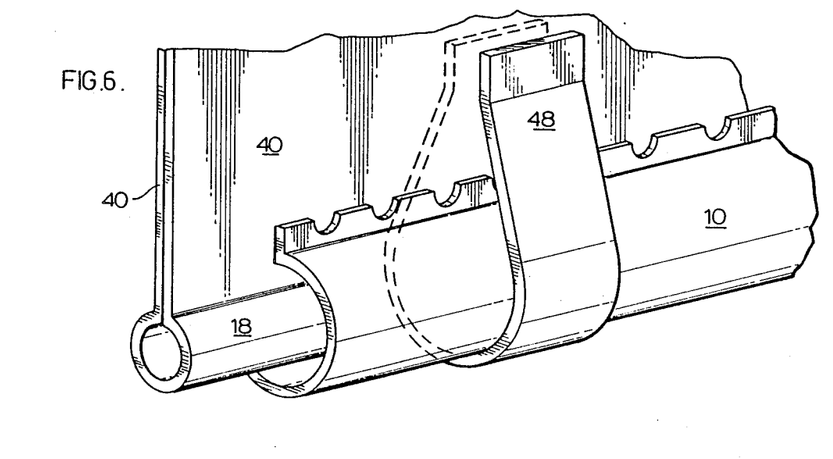
FIG. 6 is a schematic pictorial view of a safety strap on a segment of the seat slide structure shown in FIG. 4.

Safety strap 48 is shown in FIG. 6. Strap 48 is U-shaped and is welded at its upper ends to lie flat against flanges 40 of support member 22. Strap 48 curves downwardly under support member 10 marginally spaced about the outside of support member 10 so as to not impede sliding of slide tube 18 relative to support member 10. The safety strap provides increased resistance to a seat becoming disengaged from the vehicle floor under failure stress loading.

The second embodiment shows a preferred form of a locking device to lock the slide tube 18 relative to the support member. The locking device includes a generally U-shaped resilient rod 50 bent to have two legs 52 joined at a forward end by bight 54. Each support member 22 has an aperture 56 near its rear. An end portion 58 of each leg 52 is bent to extend laterally through an aperture 56 so as to journal the rod 50 for pivoting about substantially horizontal, generally coincident axes through end portions 58.

The two legs 52 extend forwardly from end portions 58, each generally along one of the support members 22 to bight 54, preferably located forward of the support members.

The upper edge 60 of flanges 13 on channel member 10 have a number of catch grooves or notches 62 cut therein and sized to receive a latch portion 64 of each rod 50 which extends laterally across the flanges 13 and on pivoting of the rod 50 about end portions 58 can be lifted to disengage from notches 62 or lowered to engage notches and lock support members 22 and their associated U-shaped slide tubes 18 against sliding.

Figure 9:
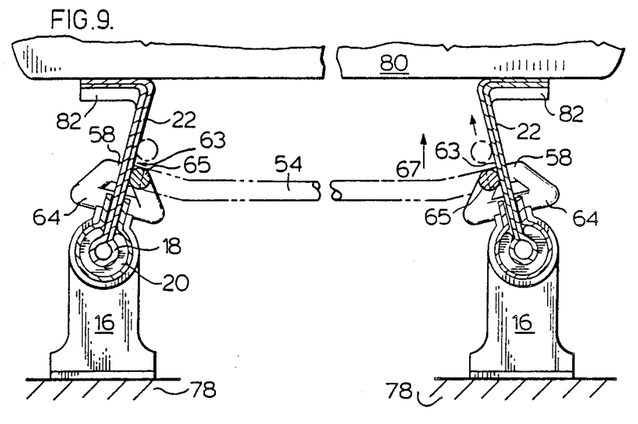
FIG. 9 is a schematic cross-sectional rear view showing to seat slide structure of FIG. 4 coupling a seat to a vehicle floor.

As best seen in FIG. 9, the two spaced support members 22 are disposed in planes which diverge away from each other as they extend upwardly. These planes are preferably at equal angles to the vertical.

Each leg 52 of rod 50 carries a cam portion 65 which engages on an inner camming surface portion 63 of a flanges 40. By reason of flanges 40 diverging, pivoting of rod 50 about its end portions in a first direction 67, i.e. upwardly, causes the legs of rod 50 to be pushed together thereby compressing rod 50. The inherent resiliency of U-shaped rod 50 resists such compression and serves to urge the rod 50 by reason of cam portions 65 engaging camming surface portions 63 in an opposite second direction, i.e. downwardly.

Preferably, rod 50 will be pre-stressed prior to assembly 10 that the resiliency of rod 50 will urge the rod downwardly into a locked position at all times.

Release of the locking mechanism is achieved by a user drawing bight 54 upwardly pivoting rod 50 in the first direction 67 and increasing the inherent bias of rod 50 to spring back downwardly. On release of bight, rod 50 will spring back downward to a locked position.

Figures 7, 8:
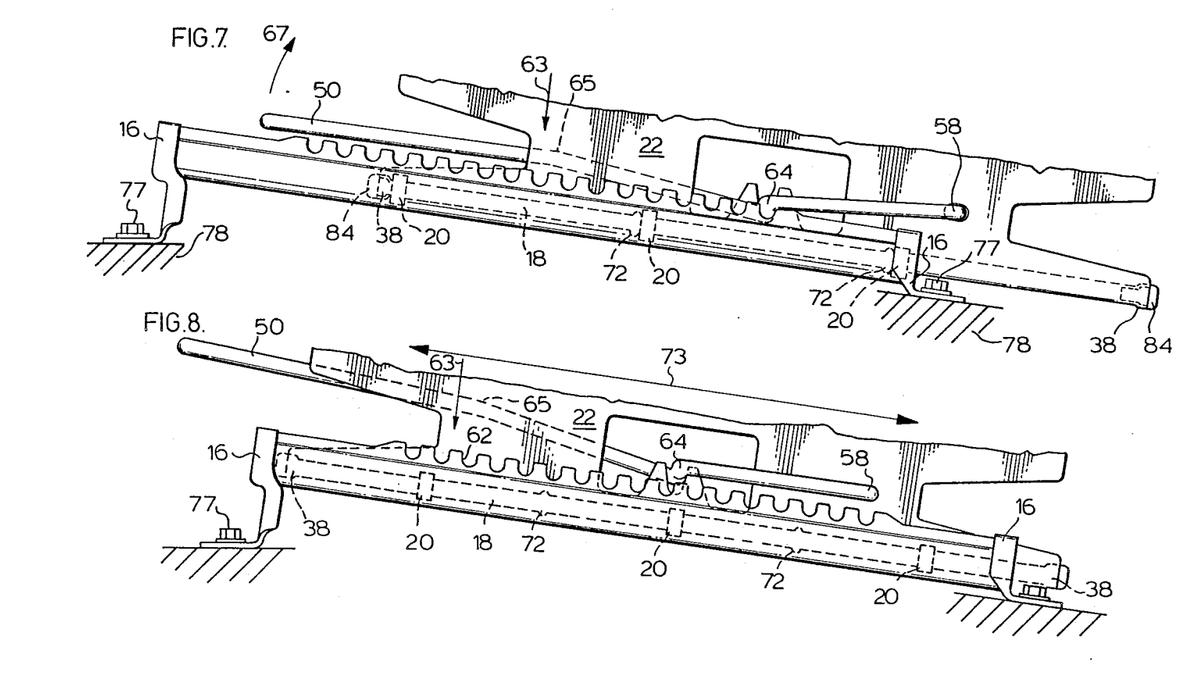
FIGS. 7 and 8 are schematic side views of a seat slide structure similar to that shown in FIG. 4 showing the seat slide structure in different positions.

As best seen in FIGS. 4, 7 and 8, support member 22 has a cut-out portion 70. This reduces weight without substantial strength reduction and provides an aperture through which latch portion 64 of rod 50 may pass laterally. Two guide prongs 74 of support member 22 extend upwardly into portion 70 and define a groove 76 therebetween which serves to retain rod 50 in desired positions relative to support member 22.

Rod 50 is seen to extend laterally as end portion 58, then along side the outside of support 22 to latch portion 64 which extends laterally. Rod 50 extends forwardly along the inside of support 22 to cam portion 64 in engagement with camming surface portion 63 then forwardly before extending laterally as bight 54.

FIGS. 7 and 8 show side views of the embodiment of FIG. 4 in two different positions. In FIG. 7, slide tube 18 is in its rearmost position with the rear ring bearing 20 sandwiched between rear end cap 16 and rear stop 72. Rod 50 is shown in a locked position with latch portion 64 received in a rearmost notch 62. FIG. 8 shows the slide tube 18 in an intermediate position and rod 50 unlocked as by being manually retained in a raised position so that latch portion 64 is raised above notches 62 and slide tube 18 is free to slide forwardly or rearwardly as indicated by arrow 73.

FIGS. 7 and 8 differ from FIG. 4 in that they show preferred forms for the end caps 16 which can be stamped from a sheet of metal. The end caps 16 are shown bolted by bolts 77 to vehicle floor pan 78. Protective end guards 84, preferably of rubber or plastic, are shown inserted into the ends of slide tube 18 to protect an occupant from sharp edges on tube 10.

FIG. 9 best shows camming surfaces 63 disposed on the inside of inwardly and upwardly angled support members 22 so that or rotation of rod 50 upwardly about end portions 58, cam portions 65 are urged inwardly flexing rod 50 and developing a bias urging the rod downwardly. FIG. 9 shows each support member 22 as preferably including a horizontally extending top flange 82 to support occupant seat 80.

FIG. 10 best schematically shows the relative locations of rod 50 and support members 22. Due to support members being angled, FIG. 10 does not represent any actual cross-section through members 22.

Figure 11:
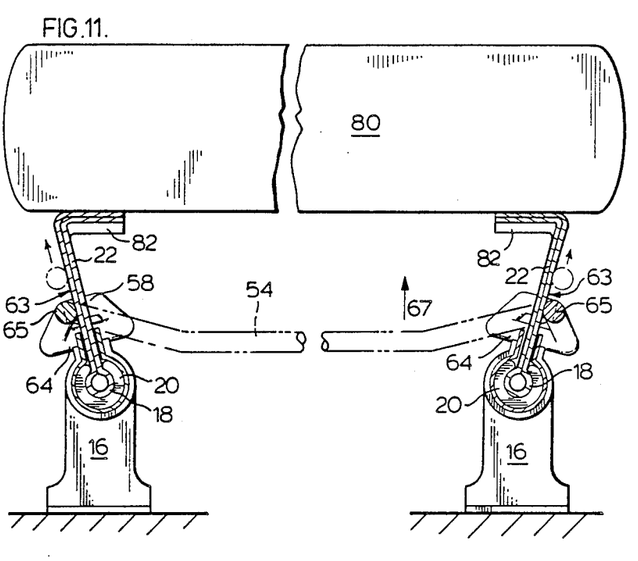
FIG. 11 is a view similar to FIG. 9 of the seat slide structure of FIG. 4 in a different configuration.

FIG. 11 shows a similar arrangement to that of FIG. 9 but with support members 22 disposed to diverge as they extend upwardly. In FIG. 11, camming surfaces 63 are on the outside of support member 22 as is cam portion 65. On pivoting of rod 50 upward, the legs 52 become spread in developing the bias to urge the rod downward to a locked position.

As is well-known, spring means (not shown) may be provided to bias the slide tube 18 to slide forwardly when rod 50 is in an unlocked position.

FIG. 4 shows notches 62 provided on flanges 13 to catch rod 50. Notches 62 and rod 50 are both a preferred embodiment of a locking mechanism. Many other locking systems may be provided. Advantageously, flanges 13 may be utilized as a convenient portion upon which to provide catch means as notches or apertures to be engaged by latch means.

Figure 12:
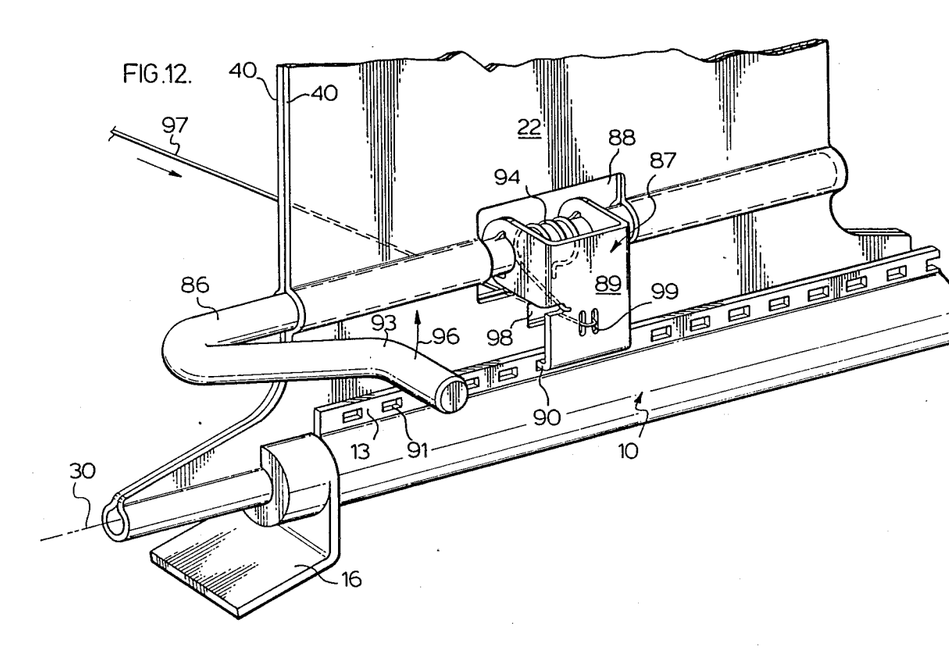
FIG. 12 is a partial pictorial view of a third embodiment of a seat slide structure in accordance with the present invention and including another locking mechanism.
Figure 13:
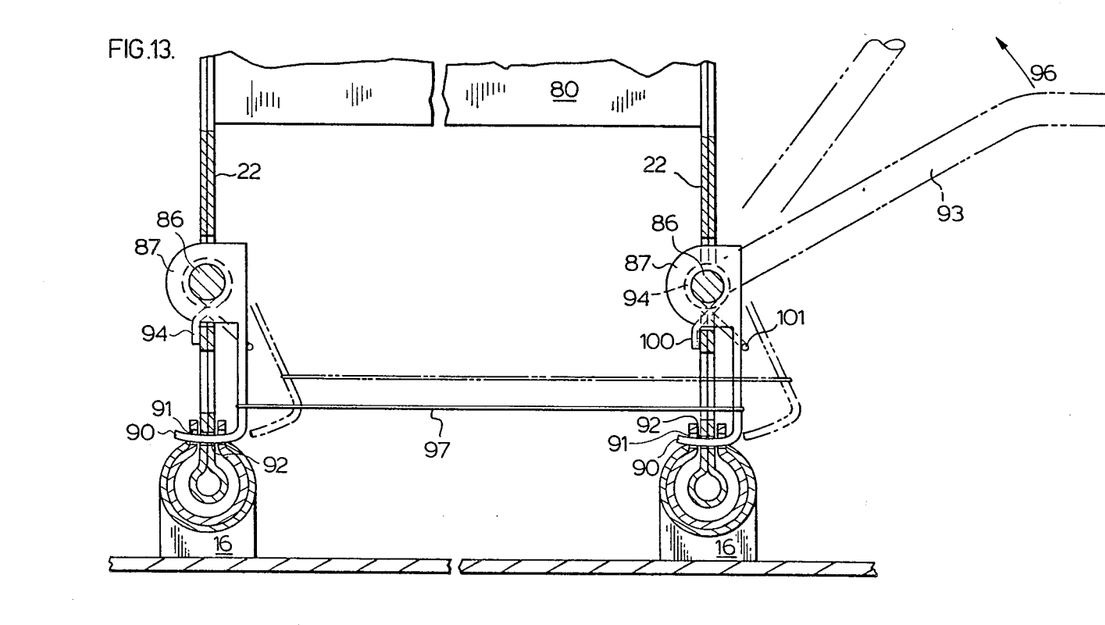
FIG. 13 is a schematic cross-sectional front view showing the seat slide structure of FIG. 12 coupling a seat to a vehicle floor.

Reference is now made to FIGS. 12 and 13 showing a third embodiment of a seat slide structure in accordance with the present invention. The third embodiment represents a form of the second embodiment modified to utilize a different locking device. Similar elements of the third embodiment are designated by similar reference numerals used with the first and second embodiments.

Release rod 86 is carried by support member 22 journalled thereon about an axis parallel axis 30. Rod 86 is journalled in a cylindrical recess formed between outwardly bent portions of flanges 40 forming support member 22. Many other journalling systems could be provided. Catch member 87 is secured to rod 86 within a major aperture 88 cut from support member 22. Catch member 87 has an arm 89 carrying two or three prongs 90.

Flanges 13 of channel member 10 have aligned slots 91 therethrough sized so that prongs 90 may, when the slots 91 are in registry with prongs 90, permit the prongs to extend through slots to 91 on one flange 13, through two slots 92 in support member 22, and out slots 91 on the other flange 13 so as to lock the support member 22 to channel member 10.

Rod 86 may be rotated by manually urging handle portion 93 in the direction indicated by arrow 96 to pivot catch member 87 so that prongs 90 disengage slots 91, and permit relative sliding of the support member 22 and channel member 10. Spring member 94 biases rod 86 to rotate towards a locked position with one end 100 of the spring engaging support member 22 and another end 101 of the spring engaging catch member 87.

As seen in FIG. 13, two such locking mechanisms may be provided on two support members 22. Only one rod 86 needs a handle portion 93 as the other can be activated by a wire 97 extending from one catch member 87 to the other through a lesser aperture 98 in support member 22. Wire 97 may be coupled to each catch arm 89 by looping through cut-out slots 99.

The invention has been described with reference to preferred embodiments. Many variations and modifications will now occur to those skilled in the art. For a definition of the invention, reference is made to the appended claims.

What I claim is:

1. A seat slide structure for supporting a vehicle occupant seat on a vehicle comprising:

two elongate channel means, each having an elongate generally cylindrical guideway means therein and an elongate axially extending slot means through the channel means into the guideway means, two elongate generally cylindrical slide tube means, one in the guideway with a central axis therethrough, two elongate planar support means, one secured to each of the slide tube means to extend outwardly from one side of the slide tube means through the slot means in a plane parallel to the central axis through the slide tube means, ring bearing means within the channel means between the channel means and the slide tube means locating the slide tube means coaxially within the guideway means axially slidable therein, end cap means coaxially about each end of the channel means coupling the channel means to the vehicle floor, the support means adapted to be coupled to and support a vehicle occupant seat, lock means to releasably lock the slide tube means and planar support means against movement relative to the channel means, said two channel means disposed parallel, laterally spaced from each other with each having one said slide tube means slidable therein and one associated said planar support means, the two planar support means adapted to be coupled to and support the said vehicle occupant seat at laterally spaced locations, a pair of parallel planar flange means on each channel means defining the slot means therebetween, the lock means comprising a generally U-shaped rod means having two legs joined by a central bight portion, ends of the rod means coupled to respective ones of the two support means with the legs extending forwardly along the respective support means to the bight portion which extends between the support means, each end of the rod means coupled to the support means for pivoting about generally coincident axes roughly parallel the bight means, a plurality of similar catch means carried by the flange means of each channel means, each leg including a latch portion to engage the catch means on its respective channel means on pivoting of the rod means about the axes in first direction and to disengage therefrom on pivoting in a second, opposite direction, said two parallel support means disposed in planes at an angle to each other, side surfaces of the planar support means providing camming surfaces, each leg means including a cam portion engaging said camming surface on its respective planar support means to urge the legs either both toward each other or both away from each other in opposition to an inherent bias of the rod means, thereby forcing the rod means to pivot about said axes in the first direction.

2. A seat slide structure as claimed in claim 1 wherein the elongate channel means has at each end an outer, at least partially cylindrical side wall, the end cap means has end wall means and an at least partially cylindrical side wall means extending from the end wall means generally normal thereto, the end cap means coupling the channel means to the vehicle floor with each end of the channel means received in one end cap means with an end of the channel means in abutment with the end wall means and with the cylindrical side wall means engaging the outer cylindrical side wall of the channel means.

3. A seat slide structure as claimed in claim 2 including:

an end cap opening through said end wall means of each end cap means coaxially aligned with said slide tube means, said end cap opening sized to permit said slide tube means to pass through said end cap means as the slide tube means slides coaxially within said channel means yet to prevent passage of said ring bearing means therethrough.

4. A seat slide structure as claimed in claim 3 including:

an end cap slot through said end wall means and side wall means of each end cap means aligned with the slot means through the channel means, said end cap slot sized to permit said support means secured to the slide tube means to pass through said end cap means as the slide tube means slides coaxially within said channel means.

5. A seat slide structure as claimed in claim 1 wherein said catch means comprise complimentary notch means cut out from upper edges of each pair of flange means, said latch portion of each leg extending above the support means transversely across the pair of flange means for engagement in the latch means.

6. A seat slide structure as claimed in claim 5 wherein said planar support means are disposed in planes to diverge upwardly at equal angles to a vertical, the camming surfaces provided on outside surfaces of the planar support means and engaging the cam portions on the legs to spread the legs against an inherently resiliency of the rod means which urges the rod means to pivot in the first direction.

7. A seat slide structure as claimed in claim 5 wherein said planar support means are disposed in planes to diverge downwardly at equal angles to a vertical, the camming surfaces provided on inside surfaces of the planar support means and engaging the cam portions on the legs compress the legs against an inherently resiliency of the rod means which urges the rod means to pivot in the first direction.

8. A seat slide structure as claimed in claim 5 wherein said rod means comprises an integral metal rod bent to provide said U-shape, camming portion, latch portion and having an inherent resiliency.

9. A seat slide structure as claimed in claim 8 wherein end portions of said rod means are disposed parallel said axes and are coupled to said support means by passing through apertures therethrough.

10. A seat slide structure as claimed in claim 1 wherein said tube means and planar support means comprise an integral piece of sheet metal bent to provide said tube means as a lower cylindrical portion with two planar flange means extending upwardly therefrom to form said support means.

11. A seat slide structure as claimed in claim 1 including safety strap means coupled to the planar support means on one side thereof and extending about said channel means closely disposed thereabout to where the strap means is coupled to the other side of the planar support means.

12. A seat slide structure for supporting a vehicle occupant seat on a vehicle comprising:
   two elongate channel means, each having an elongate guideway means therein and an elongate slot means through the channel means into the guideway means,
   two elongate slide means, on slidable in each of said guideway,
   two elongate planar, parallel support means, one secured to each of the slide means to extend outwardly from one side of the slide means through the slot means in a plane parallel to the slide means,
   the two planar support means adapted to be coupled to and support the vehicle occupant seat at laterally spaced locations with the two support surfaces disposed in planes at an angle to each other,
   means coupling the channel means to the vehicle floor,
   lock means to releasably lock the slide means and planar support means against movement relative to the channel means,
   the lock means comprising a generally U-shaped rod means having two legs joined by a central bight portion,
   ends of the rod means coupled to respective ones of the two support means with the legs extending forwardly along the respective support means to the light portion which extends between the support means,
   each end of the rod means coupled to the support means for pivoting about generally coincident axes roughly parallel the bight means,
   a plurality of similar catch means carried by each channel means,
   each leg including a latch portion to engage the catch means on its respective channel means on pivoting of the rod means about the axes in a first direction and to disengage therefrom on pivoting in a second, opposite direction,
   side surfaces of the planar support means providing camming surfaces,
   each leg means including a cam portion engaging said camming surface on its respective planar support means to urge the legs either both toward each other or both away from each other in opposition to an inherent bias of the rod means, thereby forcing the rod means to pivot about said axes in the first direction.

13. A seat slide structure as claimed in claim 12 wherein a pair of parallel planar flange means one each channel means define the slot means therebetween.

14. A seat slide structure as claimed in claim 13 wherein said catch means are carried by the flange means of each channel means.

15. A seat slide structure as claimed in claim 14 wherein said catch means comprise complimentary notch means cut out form upper edges of each pair of flange means,
   said latch portion of each leg extending above the support means transversely across the pair of flange means for engagement in the latch means.

16. A seat slide structure as claimed in claim 15 wherein said planar support means are dispose din planes to diverge downwardly at equal angles to a vertical,
   the camming surfaces provided on inside surfaces of the planar support means and engaging the cam portions on the legs compress the legs against an inherently resiliency of the rod means which urges the rod means to pivot in the first direction.

17. A seat slide structure as claimed in claim 15 wherein said planar support means are disposed in planes to diverge upwardly at equal angles to a vertical,
   the camming surfaces provided on outside surfaces of the planar support means and engaging the cam portions on the legs to spread the legs against an inherently resiliency of the rod means which urges the rod means to pivot in the first direction.

18. A seat slide structure as claimed in claim 17 wherein said rod means comprises a integral metal rod bent to provide said U-shape, camming portion, latch portion and having an inherent resiliency.

19. A seat slide structure as claimed in claim 18 wherein end portions of said rod means are disposed parallel said zes and are coupled to said support means by passing through apertures therethrough.

20. A seat slide structure as claimed in claim 19 wherein said slide means and planar support means comprise an integral piece of sheet metal bent to provide said slide means as a lower tubular cylindrical portion with two planar flange means extending upwardly therefrom to form said support means.

* * * * *